US007926005B1

(12) United States Patent
Li et al.

(10) Patent No.: US 7,926,005 B1
(45) Date of Patent: Apr. 12, 2011

(54) PATTERN-DRIVEN ROUTING

(75) Inventors: Jianmin Li, Los Gatos, CA (US); Gang Huang, San Jose, CA (US); Taufik Arifin, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 374 days.

(21) Appl. No.: 11/966,689

(22) Filed: Dec. 28, 2007

(51) Int. Cl.
*G06F 17/50* (2006.01)
(52) U.S. Cl. ............. 716/51; 716/50; 716/126; 716/130
(58) Field of Classification Search ............. 716/12–14, 716/19, 5, 21, 50, 51, 126, 129, 130
See application file for complete search history.

(56) References Cited

U.S. PATENT DOCUMENTS

| | | | | |
|---|---|---|---|---|
| 6,077,310 | A * | 6/2000 | Yamamoto et al. | 716/19 |
| 7,657,852 | B2 * | 2/2010 | Waller | 716/5 |
| 2002/0007481 | A1 * | 1/2002 | Ono | 716/21 |
| 2003/0115569 | A1 * | 6/2003 | Ikeuchi | 716/19 |
| 2007/0044060 | A1 * | 2/2007 | Waller | 716/13 |
| 2007/0092142 | A1 * | 4/2007 | Kuriathungal et al. | 382/209 |
| 2007/0106971 | A1 * | 5/2007 | Lien et al. | 716/13 |

OTHER PUBLICATIONS

Yang, J. et al., Layout verification and optimization based on flexible design rules, Design and Process Integration for Microelectronic Manufacturing IV, Proc. SPIE, vol. 6156, 61560A (2006).
Lavin, M. et al., Backend CAD flows for "restrictive design rules", IEEE/ACM International Conference on Computer Aided Design, Nov. 2004. ICCAD-2004, pp. 739-746.
Mitra, J. et al., RADAR: RET-aware detailed routing using fast lithography simulations, Proceedings. 42nd Design Automation Conference, Jun. 2005, pp. 369-372.
Huang, L., Optical proximity correction (OPC): friendly maze routing, Proceeding DAC '04 Proceedings of the 41st annual Design Automation Conference, 2004, pp. 186-191.

* cited by examiner

*Primary Examiner* — Sun J Lin
(74) *Attorney, Agent, or Firm* — Vista IP Law Group LLP (57) ABSTRACT

A method and system for pattern-driven routing are disclosed. Embodiments of pattern-driven routing are disclosed for creating a representation for at least a portion of an initial routing solution, comparing the representation for at least the portion of the initial routing solution with a pattern, and determining whether the initial routing solution has lithographic issues based on the comparison.

21 Claims, 8 Drawing Sheets

PATTERN-DRIVEN ROUTING

FIELD

The invention relates to the design of integrated circuits.

BACKGROUND

A semiconductor integrated circuit (IC) has a large number of electronic components, such as transistors, logic gates, diodes, wires, that are fabricated by forming layers of different materials and of different geometric shapes on various regions of a wafer. Many phases of physical design may be performed with computer aided design (CAD) tools or electronic design automation (EDA) systems. To design an integrated circuit, a designer first creates high level behavior descriptions of the IC device using a high-level hardware design language. The high level behavior descriptions of the IC device are translated into netlists of various levels of abstraction using a computer synthesis process. A netlist describes interconnections of nodes and components on the chip and includes information of circuit primitives such as transistors and diodes, their sizes and interconnections, for example.

An integrated circuit designer may use EDA layout tools to create a physical integrated circuit design layout from a logical circuit design. The layout tools use geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools.

Optical lithography, which is also referred to as photolithography, is a fabrication process by which patterns for various devices are generated on substrate wafers. One or more photomask, or more simply "masks," provide the master image of a layer of a given integrated circuit chip's physical geometries. A typical photolithography system projects UV light energy onto and through the one or more masks in order to transmit the mask pattern in reduced size to the wafer surface, where it interacts with a photosensitive coating on the wafer.

The resolution limit of conventional optical lithography technology is increasingly being challenged by the sub wavelength dimensions of the critical IC feature dimensions and geometries. Not only are the critical dimension feature geometries steadily decreasing in size, but the quantity of these features is also growing at a dramatic rate as well. These critical feature geometries also need to be patterned very precisely due to the severity and sensitivity of the imaging process and therefore, the lithography process plays a significant role in all aspects of the IC design flow.

In the integrated circuit design flow, routing involves assigning wires and vias to create a circuit connection. A routing solution is usually driven by design rules (DRC), a set of requirements, such as spacing requirements between two objects and routing object size requirements, to be met by a router in order to have a working circuit. DRC governs how an object has to be spaced relative to another object and to meet the width requirement. The DRC rules that govern spacing between two objects may not always adequately account for lithographic effects with the decreased dimensions of the critical IC features and geometries.

For example, the light wave length (e.g. 193 nm) may be much larger than feature widths of the printed geometry (e.g. 65 nm or less). As such, the light waves used to print an object can interfere with the light waves used to print surrounding objects. Because of these lithographic issues, the spacing requirements between two objects verified by DRC rules can be affected by other surrounding objects not contemplated by the DRC rules.

To overcome these lithographic issues, one approach of chip manufacturers or foundries is to translate the lithographic issues into new design rules. However, the new design rules that account for the lithographic issues with multiple objects have become very complicated because the rules involve more than two objects. In some cases, the design rules are difficult to abstract because the effects of lithography are hard to predict with the number of factors that must be accounted for in determining the lithographic effects, such as the light source, focus and mask. The number of design rules and variations in design rules have increased significantly with the seemingly infinite number of combinations of objects that need to be taken into account for routing. Furthermore, even if all of the rules were defined, it has become too difficult for routers to honor all the design rules. Thus, rule driven routing may be limited in its ability to handle all the lithography related issues.

Another approach to overcome the lithographic issues is to build an optical model and simulation engine, and calculate the lithographic effects. However, it is difficult for manufacturers to create a model for designers to generate a lithography-friendly layout because the accuracy of the model is dependent on such factors as the process site, the parameters and the device. Further, incorporating simulation into the router significantly slows the router down. Due to the limitations of the described approaches, there is a need for a new approach to reduce the impact of lithographic effects on routing and thereby, increase the chance for a higher yield.

SUMMARY OF THE INVENTION

A method and system for pattern-driven routing are disclosed. Pattern-driven routing comprises creating a representation for at least a portion of an initial routing solution, comparing the representation for at least the portion of the initial routing solution with a pattern, and determining whether the initial routing solution has lithographic issues based on the comparison.

BRIEF DESCRIPTION OF THE DRAWINGS

The invention is illustrated by way of example and not limitation in the figures of the accompanying drawings, in which like references indicate similar elements and in which.

DETAILED DESCRIPTION

Embodiments of the present invention provide methods, systems, and mediums for implementing pattern driven routing.

According to some embodiments, pattern driven routing utilizes pattern matching to determine whether a routing solution has lithographic issues. Pattern matching is a method of comparing the layouts of at least two portions of an IC design and determining whether the two portions of the IC designs are similar. Pattern matching can be performed with generated or calculated layouts for an IC design, and a pattern may have a geometry or geometries that are a subset of an IC design. A pattern driven router compares portions of a routing solution to patterns with either known lithographic issues or known lithographic clean patterns stored in a routing pattern library, and can determine whether the routing solution has lithographic issues if a portion of the routing solution matches a known good pattern (i.e. lithographic-clean pattern) or bad pattern (i.e. known lithographic issues). By using pattern matching, the pattern driven router may more easily identify lithographic issues in routing solutions that involve multiple objects, and differs from other approaches such as DRC, which generally is limited to handling lithographic issues between a small number of objects.

Figure 1:
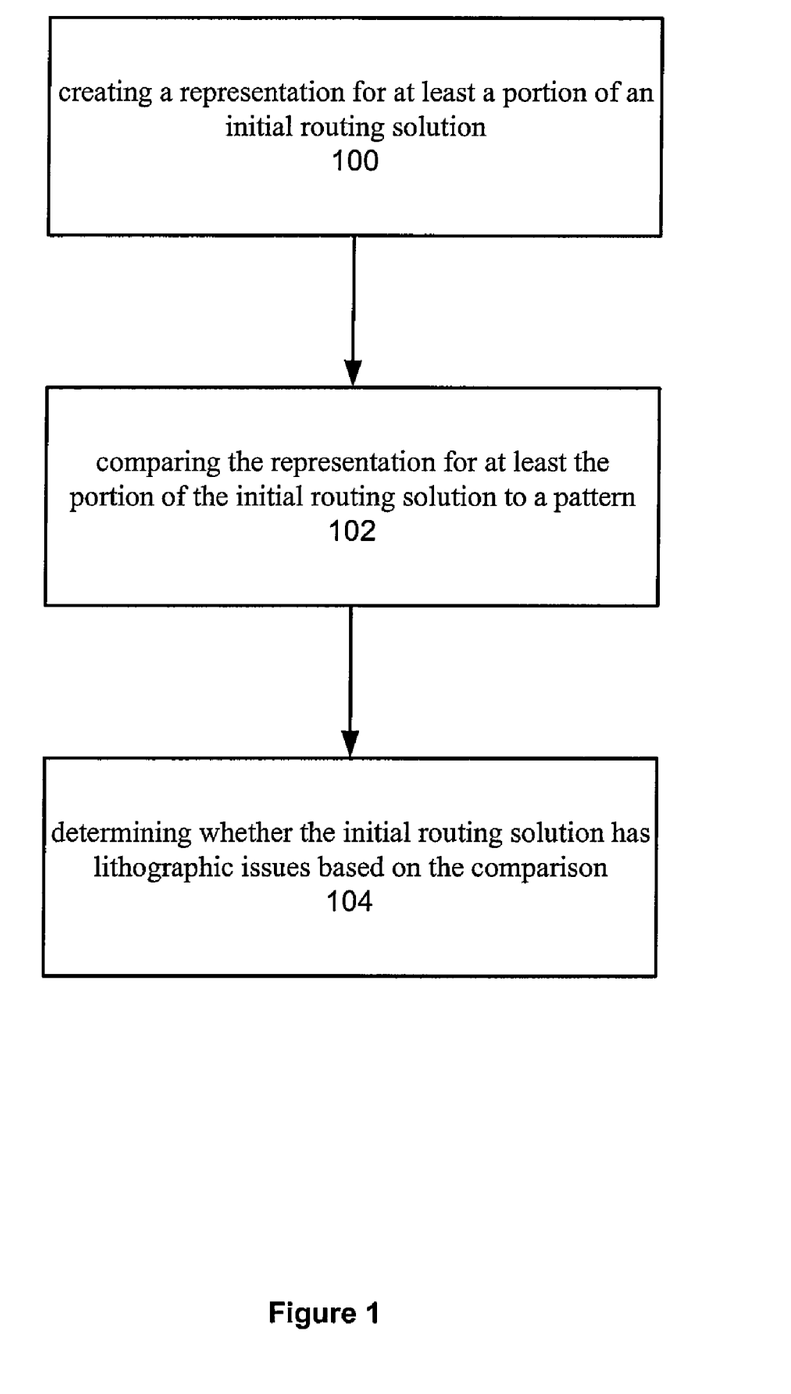
FIG. 1 is a flowchart of an approach for pattern driven routing.

FIG. 1 is a flowchart of an approach for pattern driven routing. Initially, a representation for at least a portion of an initial routing solution is created (100). The initial routing solution is an IC design that contains one or more objects. The initial routing solution may be a routing solution that has already been verified as DRC Clean Design, an IC design with no DRC violations, by a rule-driven router. Any suitable representation of the portion of the initial routing solution may be created by the pattern driven router that facilitates pattern matching, such as representing the portion as a mathematical function and/or using the pattern itself. In one or more embodiments, the representation of at least a portion of the initial routing solution captures the lithographic effects of a design.

The initial routing solution may be broken up into portions for the pattern driven router to perform comparisons between the portion and the known good or bad patterns. In one or more embodiments, a default size for the portion that is selected is determined by experimentation with pattern matching, and a series of the default size portions are selected from the initial routing solution for pattern matching until the entire routing solution has undergone pattern matching with the known good or bad patterns in the Routing Pattern Library. Those skilled in the art will recognize that there are many ways to select a portion of a routing solution. For example, embodiments may select a portion by using a critical point in the initial routing solution and a portion of the IC design surrounding the critical point. Next, a comparison of the representation for at least the portion of the initial routing solution with a pattern is performed (102). In one or more embodiments, the pattern has been extracted from known routing solutions that either have lithographic issues or are an ideal routing solution from a lithographic perspective. Optionally, the pattern may be represented by one or more mathematical functions to facilitate pattern matching. Embodiments may not require that the representation for a portion of the routing solution be an exact match with the pattern to indicate a lithographic issue. Optionally, the Pattern Driven Router may account for a percentage error in comparing the pattern to the routing solution and alter a determination on the lithographic issues present in the design or results from the comparison accordingly. The patterns used for pattern driven routing may be stored in a Routing Pattern Library or database.

Continuing with FIG. 1, a determination is made as to whether the initial routing solution has lithographic issues based on the comparison (104). In one or more embodiments, if the representation for at least a portion of the initial routing solution matches a lithographic-unfriendly pattern or bad pattern, then the initial routing solution will fail due to lithographic issues known to be present in the known bad pattern. In some embodiments, the Routing Pattern Library will contain a routing solution for handling the lithographic issues and the portion of the initial routing solution may be replaced with a known solution for handling the lithographic issues. Optionally, rerouting can be performed to correct the lithographic issues based on the determination.

Figure 2:
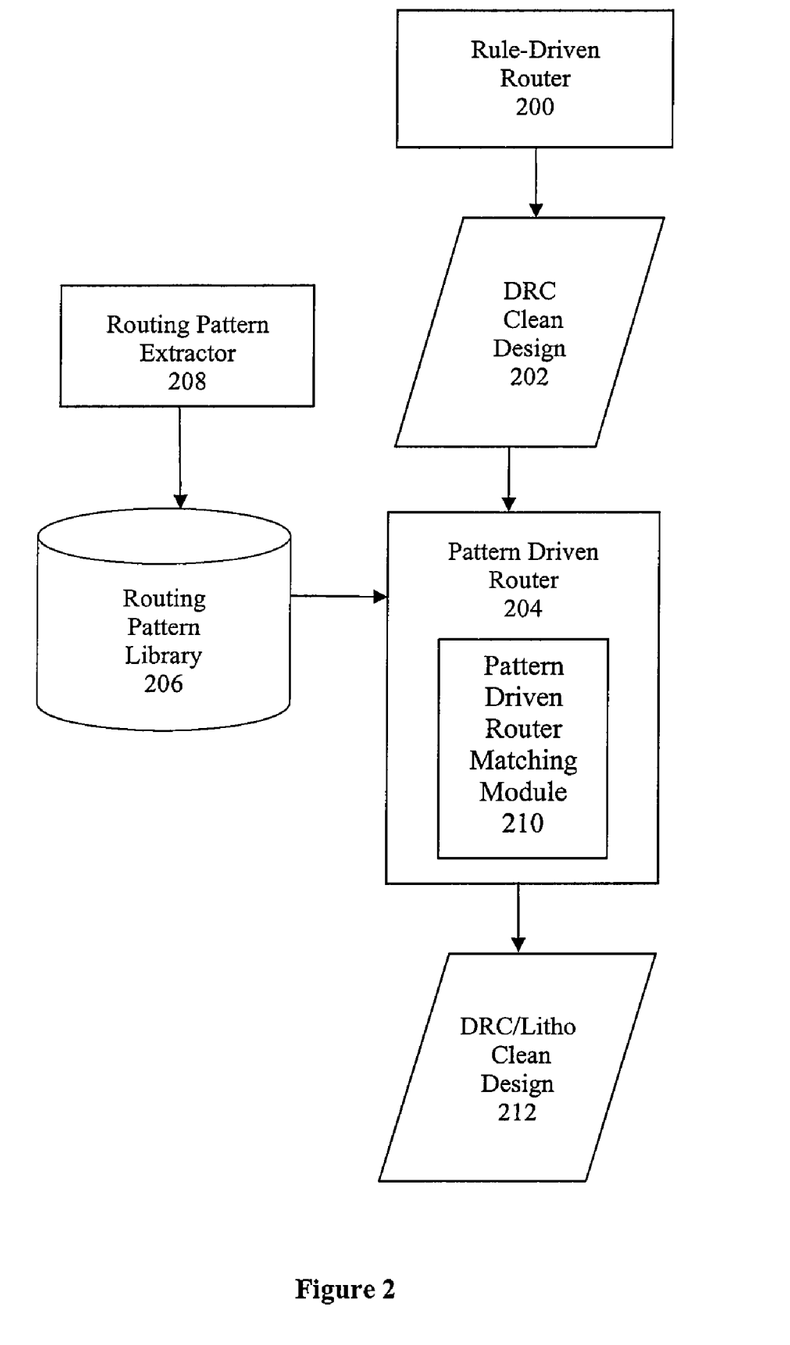
FIG. 2 shows a block diagram for an implementation pattern driven routing.

FIG. 2 shows a block diagram for an implementation of pattern driven routing. First, an initial routing solution is provided in order to perform pattern driven routing. Optionally, the initial routing solution may be the routing solution provided by a Rule Driven Router 200 and therefore, the initial routing solution may be a DRC Clean Design 202. It may be beneficial to create a DRC Clean Design 202 prior to sending the initial routing solution to a Pattern Driven Router 204 because the routing solution can shift after application of the DRC rules by the Rule Driven Router 200.

Next, the initial routing solution is provided to a Pattern Driven Router 204 to create a lithographically clean routing solution. The Pattern Driven Router 204 may use the extracted patterns in the Routing Pattern Library 206 to match and ultimately, avoid patterns for the lithographically clean routing solution. In one or more embodiments, a Pattern Driven Router Matching Module 210 is used by the Pattern Driven Router 204 to perform the comparison between a representation of at least a portion of the initial routing solution to extracted patterns stored in a Routing Pattern Library 206. In one or more embodiments, there is a better chance of a high yield if the patterns identified as having lithography issues in the Routing Pattern Library 206 are avoided.

If the patterns with lithographic issues match the representation of at least a portion of the initial routing solution, then the Pattern Driven Router 204 reroutes the routing solution to fix the route. In order to efficiently re-route the initial routing solution to avoid lithographic patterns, the Pattern Driven Router 204 may have areas of the routing solution that are designated as zones that are not preferred for routing, and the Pattern Driven Router 204 tries to avoid to route in those areas as much as possible. In some embodiments, the routing solution in those areas does not create a DRC violation but may create a lithographic issue. In one or more embodiments, the Routing Pattern Library 206 contains a corresponding solution for the lithographic issues that exist in the pattern that was matched to the representation of at least a portion of the initial routing solution. The combination of the rule driven routing and pattern driven routing allows for the creation of a DRC and Lithography Clean Design 212.

The Routing Pattern Library 206 is created from patterns extracted with a Routing Pattern Extractor 208. Optionally, the pattern may be represented with mathematical functions. The Routing Patterns Library 206 may contain patterns with lithography issues identified by manufacturing and/or identified by lithography verification tools that may utilize simulations of the routing solution. In one or more embodiments, the Routing Pattern Library 206 may provide rerouting solutions for the lithographic issues.

Figure 3:
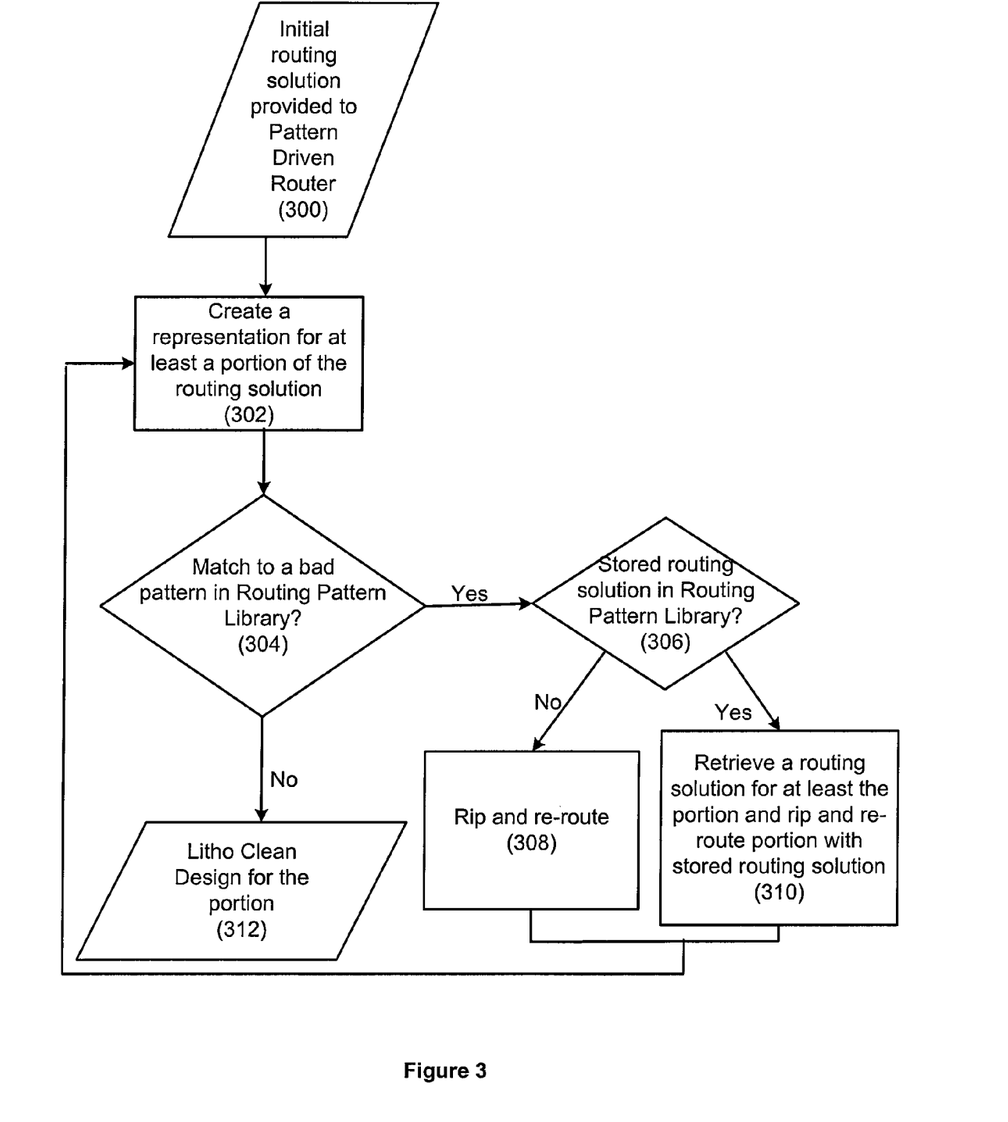
FIG. 3 shows a flowchart of a process for implementing pattern driven routing.

FIG. 3 shows a flowchart of a process for implementing pattern driven routing. As discussed above, pattern driven routing may begin with the input of a DRC Clean Design as the initial routing solution (300). A representation for at least a portion of an initial routing solution is created (302) and the representation is compared to patterns in the Routing Pattern Library 206. Optionally, the Routing Pattern Library 206 may contain patterns that are known not to have lithographic issues.

Next, the Pattern Driven Router 204 must determine whether there is a match of the representation of the portion of an initial routing solution to a bad pattern in the Routing Pattern Library (304). If there is a match to a bad pattern in the Routing Pattern Library 206 (304), then the router may need to rip up and reroute to create a new routing solution. The Pattern Driven Router 204 may check whether a routing solution for the bad pattern is stored in the Routing Pattern Library 206 (306). If there is a routing solution stored in the Routing Pattern Library 206 that corresponds to the bad pattern (306), then the Pattern Driven Router 204 may rely on a routing solution or portion of a routing solution stored in the Routing Pattern Library 206 to rip and re-route the portion of the routing solution that may have lithographic issues with a stored routing solution (310). The new routing solution generated by the Pattern Driven Router 204 is again checked by the Pattern Driven Router 204 to determine if the routing solution has lithographic issues by comparing the routing solution to patterns in the Routing Pattern Library 206 (302).

Alternatively, if there is no stored routing solution that corresponds to the bad pattern (306), then the Pattern Driven Router 204 may rip and reroute the routing solution (308). The Pattern Driven Router 204 may reroute the routing solution itself or call upon an external router to do the rerouting of the routing solution. The new routing solution generated by the Pattern Driven Router 204 is again checked by the Pattern Driven Router 204 to determine if the routing solution has lithographic issues by comparing the routing solution to patterns in the Routing Pattern Library 206 (302).

Continuing with FIG. 3, if there is no pattern match found by the Pattern Driven Router 204 (304), then the portion of the routing solution has a Lithographic Clean Design (312). As discussed above, the routing solution created by the Pattern Driven Router 204 may be both a DRC and Lithographic Clean Design. At any time in the course of pattern driven routing, the routing design may be verified as DRC clean design with the use of a Rule Driven Router 204.

Figure 4:
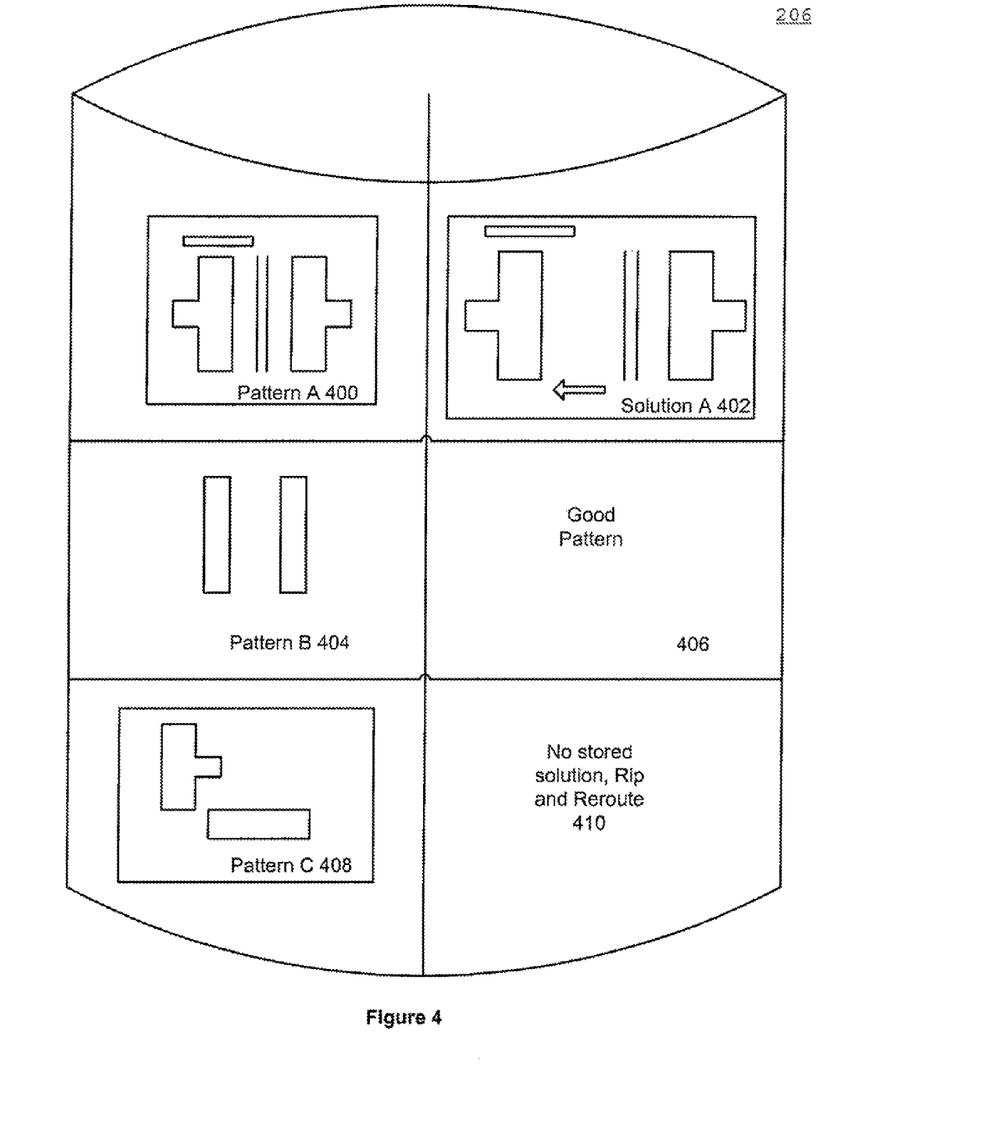
FIG. 4 shows an example of a routing pattern library.

FIG. 4 shows an example of a routing pattern library. In the Routing Pattern Library 206, a Pattern A 400 has been extracted from a routing solution that has lithographic issues with multiple objects and a corresponding Solution A 402 is provided in the Routing Pattern Library 206 for handling the lithographic issues presented by Pattern A 400. The Solution A 402 may be used to replace a pattern that was identified as a bad pattern because it matched Pattern A 400. In contrast, Pattern B 404 is a pattern that does not have any known lithographic issues and the pattern is a good pattern 406, and therefore, the portion of a routing solution that contains the Pattern B 404 may not require rerouting. Pattern C 408 is stored in the Routing Pattern Library 206 as a known bad pattern but a corresponding routing solution is not stored with the Pattern C 408, and therefore, rerouting will be necessary if Pattern C 408 is encountered 410. In one or more embodiments, it may be beneficial to have a Pattern Driven Router 204 include patterns that may be duplicative of the DRC rules such that the patterns may contain known DRC violations and if a routing solution has not gone through rule driven routing or the routing solution has been altered in the course of pattern driven routing, then the patterns with known DRC violations will identify patterns with DRC violations in pattern matching.

Figure 5:
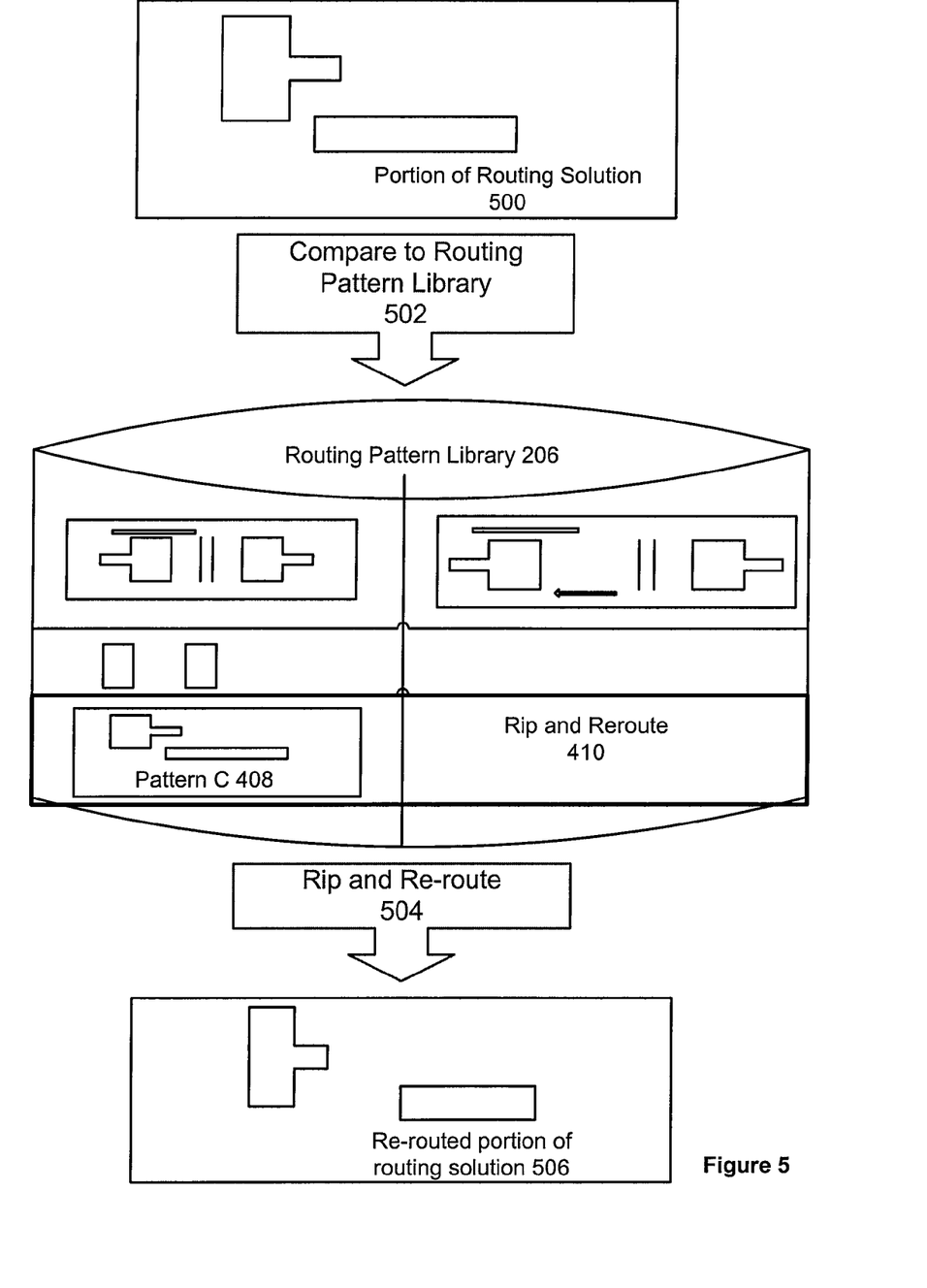
FIG. 5 illustrates an effect of pattern driven routing.

FIG. 5 illustrates an effect of pattern driven routing. First, an initial routing solution is provided to a Pattern Driven Router 204 and a portion of the initial routing solution (500) is to be compared to patterns in the Routing Pattern Library 206 (502). If the Pattern Driven Router 204 finds a match to a bad pattern in the Routing Pattern Library 206 (504), then the Pattern Driven Router 204 must determine whether a routing solution is stored in a Pattern Driven Library 206. If there is a routing solution stored in the Pattern Driven Library 206, then the Pattern Driven Router 204 retrieves the stored routing solution from the Pattern Driven Library 206 and may reroute the initial routing solution to reflect the stored routing solution (504). In this example, the portion of the initial routing solution (500) matches a bad pattern Pattern C 408 stored in the Routing Pattern Library 206. However, there is no corresponding solution for Pattern C 408 stored in the Routing Pattern Library 206 so the routing solution is a candidate for ripping and rerouting 410 and the portion of the routing solution that matches Pattern C 408 may be ripped up and rerouted (504) to become the re-routed portion of the routing solution (506).

Figure 6:
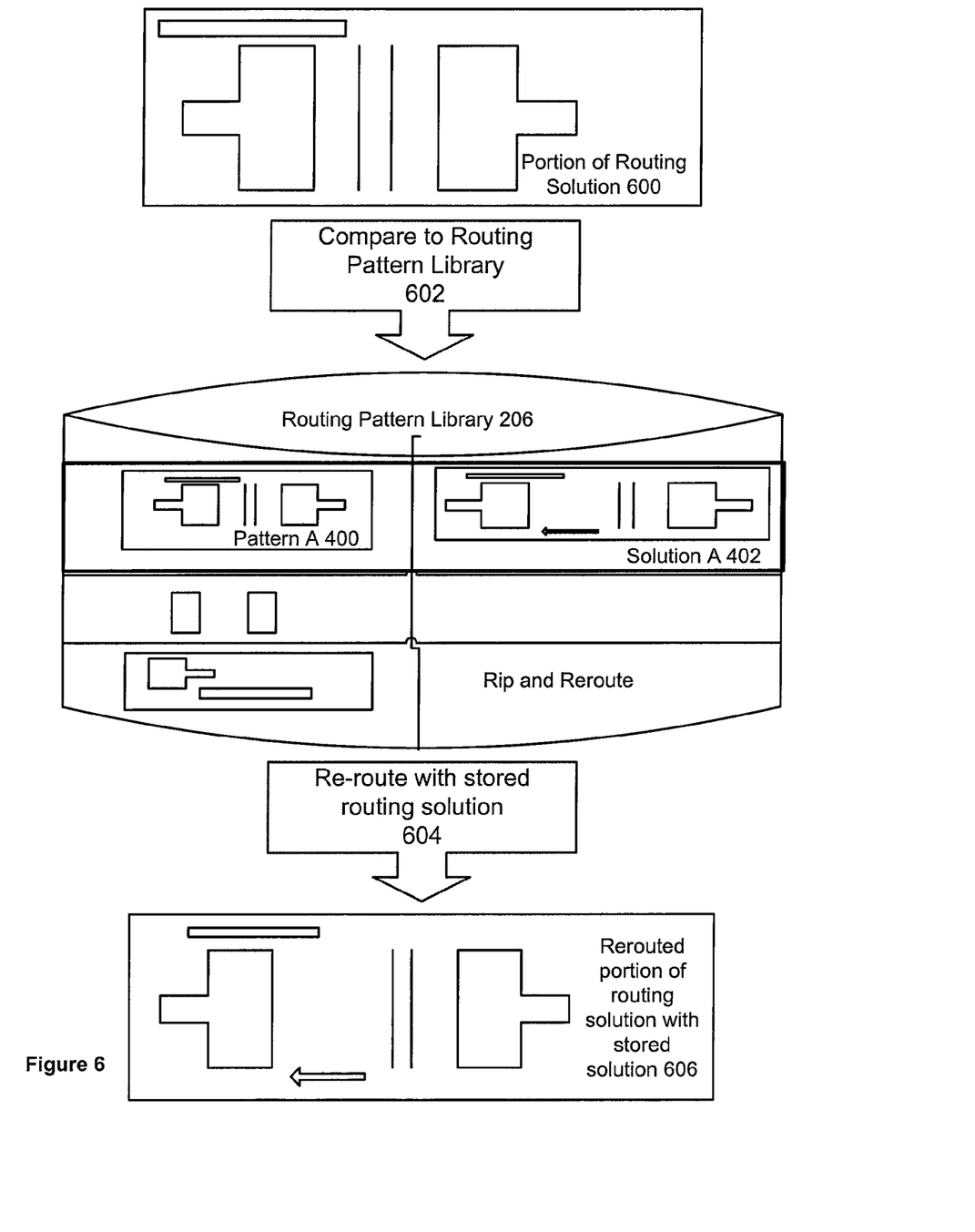
FIG. 6 illustrates an effect of pattern driven routing.

FIG. 6 illustrates an effect of pattern driven routing. A portion of an initial routing solution (600) has multiple objects that may present lithographic issues when the routing solution is realized or printed. Because there are multiple objects, the DRC rules cannot accurately account for the lithographic issues present in the initial routing solution. The portion of the initial routing solution (600) is to be compared to patterns in the Routing Pattern Library 206 (602). If the Pattern Driven Router 204 finds a match to a bad pattern in the Routing Pattern Library 206, then the Pattern Driven Router 204 must determine whether a routing solution is stored in a Pattern Driven Library 206. If there is a routing solution stored in the Pattern Driven Library 206, then the Pattern Driven Router 204 retrieves the stored routing solution from the Pattern Driven Library 206 and may alter the initial routing solution to reflect the stored routing solution (604). In this example, the portion of the initial routing solution (600) matches Pattern A 400 in the Routing Pattern Library 206 and the portion of the routing solution (600) can be replaced with Solution A 402 stored in the Routing Pattern Library 206. The portion of the routing solution that matches Pattern A 400 may be re-routed with a stored routing solution (604) to become the re-routed portion of the routing solution with the stored solution (606).

Figure 7:
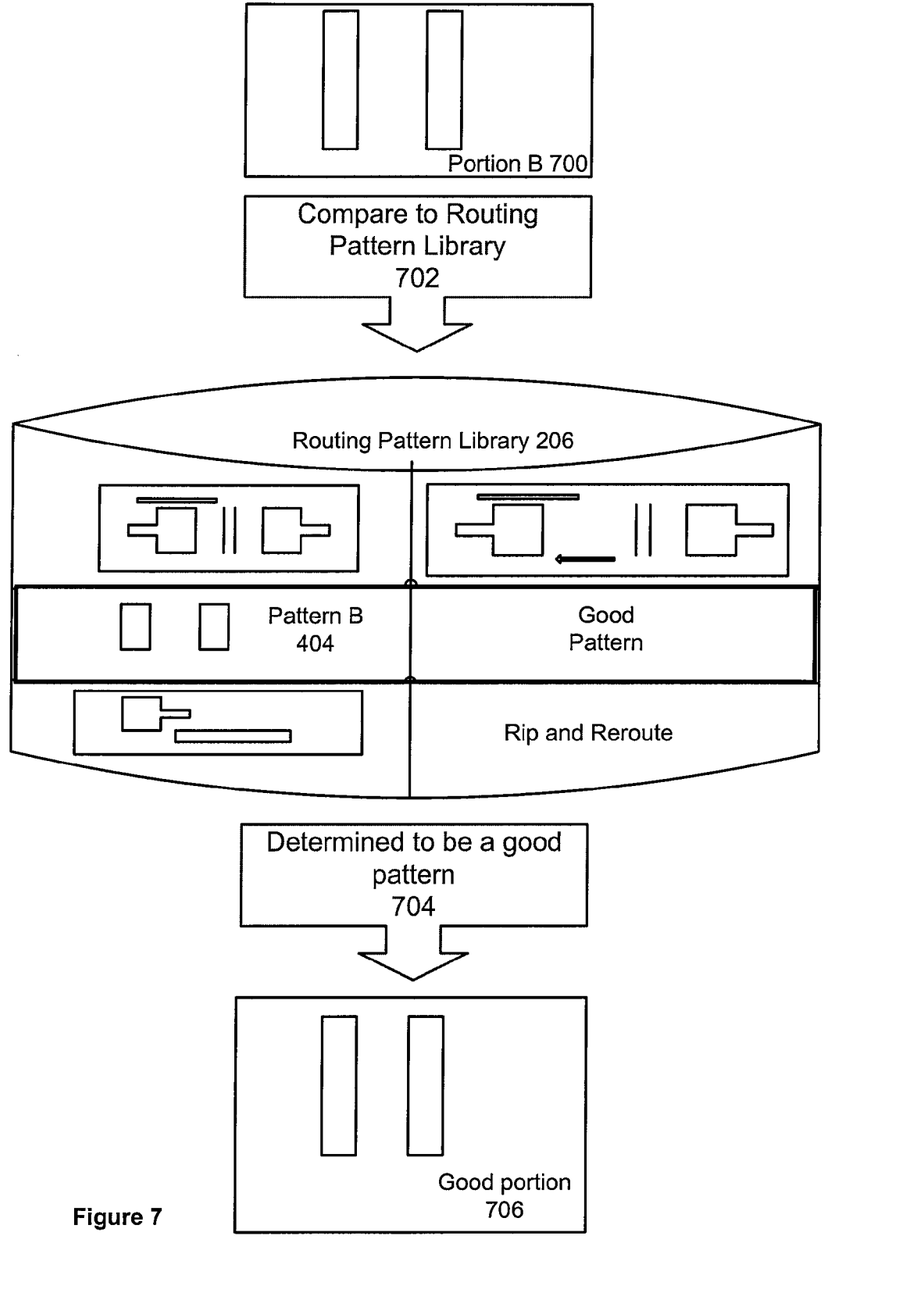
FIG. 7 illustrates an effect of pattern driven routing.

FIG. 7 illustrates an effect of pattern driven routing. A portion of an initial routing solution (700) has multiple objects that may present lithographic issues when the routing solution is realized or printed. The portion of the initial routing solution (700) is to be compared to patterns in the Routing Pattern Library 206 (702). If the Pattern Driven Router 204 finds a match to a bad pattern in the Routing Pattern Library 206 (702), then the Pattern Driven Router 204 must determine whether a routing solution is stored in a Pattern Driven Library 206. If there is a routing solution stored in the Pattern Driven Library 206, then the Pattern Driven Router 204 retrieves the stored routing solution from the Pattern Driven Library 206 and may alter the initial routing solution to reflect the stored routing solution. Alternatively, the Pattern Driven Router 204 may rip and reroute the routing solution if there is no routing solution provided in the Routing Pattern Library 206.

Continuing with FIG. 7, if the portion of the initial routing solution had not matched a bad pattern (704), then the portion of the routing solution is designated a litho-clean portion of the routing solution. In this example, the Portion 700 matches a good pattern Pattern B 404 in the Routing Pattern Library 206 and the portion is designated a litho-clean portion of the routing solution. The portion of the routing solution that matches Pattern B 404 may be determined to be a good pattern (704) and remain the same (706).

SYSTEM ARCHITECTURE OVERVIEW

In the following description, numerous details are set forth for purpose of explanation. However, one of ordinary skill in the art will realize that various embodiments of the invention may be practiced without the use of these specific details. In other instances, well-known structures and devices are shown in block diagram form in order not to obscure the description of various embodiments of the invention with unnecessary detail.

Figure 8:
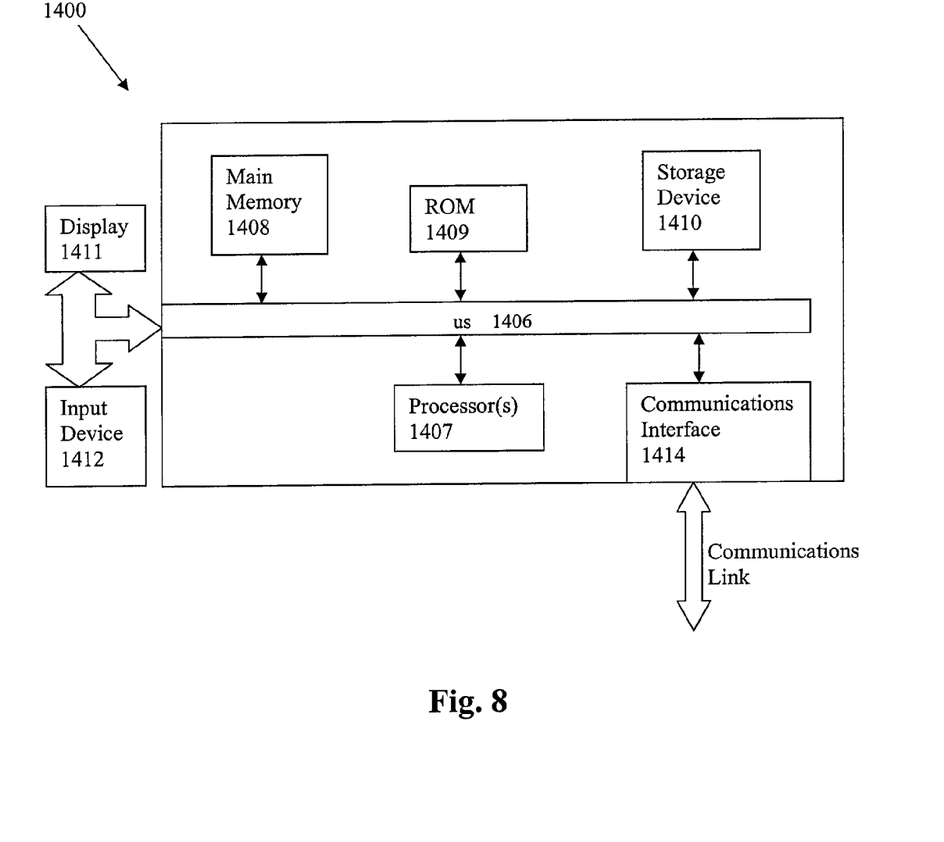
FIG. 8 shows an architecture for implementing pattern driven routing.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method for pattern driven routing, comprising:
creating a representation for at least a portion of an initial routing solution;
comparing the representation for at least the portion of the initial routing solution with a plurality of patterns in a library;
determining, by using a processor, whether the initial routing solution has lithographic issues based at least in part upon a result of the act of comparing, wherein the act of determining comprises determining whether a routing solution is provided with a pattern in the library for the initial routing solution and if there is no routing solution provided with a pattern in the library, ripping and rerouting the initial routing solution; and
storing the result in a non-transitory computer usable medium or displaying the result on a display device.

2. The method for pattern driven routing of claim 1, further comprising:
rerouting the initial routing solution if the initial routing solution matches a pattern in the library, wherein the pattern is a lithographic unfriendly pattern.

3. The method for pattern driven routing of claim 1, further comprising:
rerouting the initial routing solution to a known lithographic friendly pattern.

4. The method for pattern driven routing of claim 1, further comprising:
replacing the initial routing solution with a known lithographic friendly pattern.

5. The method for pattern driven routing of claim 1, wherein the initial routing solution is compliant with a design rule.

6. The method for pattern driven routing of claim 1, wherein the representation for at least the portion of the initial routing solution is a mathematical function.

7. The method for pattern driven routing of claim 1, wherein the representation for at least the portion of the initial routing solution contains a critical point in the initial routing solution.

8. A system for pattern driven routing, comprising:
a processor programmed for:
creating a representation for at least a portion of an initial routing solution;
comparing the representation for at least the portion of the initial routing solution with a plurality of patterns in a library;
determining whether the initial routing solution has lithographic issues based at least in part upon a result of the act of comparing, wherein the act of determining comprises determining whether a routing solution is provided with a pattern in the library for the initial routing solution and if there is no routing solution provided with a pattern in the library, ripping and rerouting the initial routing solution; and a non-transitory computer usable medium for storing the result or a display device for displaying the result.

9. The system for pattern driven routing of claim 8, wherein the processor is further programmed for rerouting the initial routing solution if the initial routing solution matches a pattern in the library, wherein the pattern is a lithographic unfriendly pattern.

10. The system for pattern driven routing of claim 8, wherein the processor is further programmed for rerouting the initial routing solution to a known lithographic friendly pattern.

11. The system for pattern driven routing of claim 8, wherein the processor is further programmed for replacing the initial routing solution with a known lithographic friendly pattern.

12. The system for pattern driven routing of claim 8, wherein the initial routing solution is compliant with a design rule.

13. The system for pattern driven routing of claim 8, wherein the representation for at least the portion of the initial routing solution is a mathematical function.

14. The system for pattern driven routing of claim 8, wherein the representation for at least the portion of the initial routing solution contains a critical point in the initial routing solution.

15. A non-transitory computer readable medium comprising instructions which, when executed by a processor, causes the processor to execute a process for pattern driven routing, the process comprising:
   creating a representation for at least a portion of an initial routing solution;
   comparing the representation for at least the portion of the initial routing solution with a plurality of patterns in a library;
   determining whether the initial routing solution has lithographic issues based at least in part upon a result of the act of comparing, wherein the act of determining comprises determining whether a routing solution is provided with a pattern in the library for the initial routing solution and if there is no routing solution provided with a pattern in the library, ripping and rerouting the initial routing solution; and
   storing the result or displaying the result on a display device.

16. The medium of claim 15, further comprising:
   rerouting the initial routing solution if the initial routing solution matches a pattern in the library, wherein the pattern is a lithographic unfriendly pattern.

17. The medium of claim 15, further comprising:
   rerouting the initial routing solution to a known lithographic friendly pattern.

18. The medium of claim 15, further comprising:
   replacing the initial routing solution with a known lithographic friendly pattern.

19. The medium of claim 15, wherein the initial routing solution is compliant with a design rule.

20. The medium of claim 15, wherein the representation for at least the portion of the initial routing solution is a mathematical function.

21. The medium of claim 15, wherein the representation for at least the portion of the initial routing solution contains a critical point in the initial routing solution.

* * * * *